United States Patent [19]

Takahashi et al.

[11] Patent Number: 5,032,316
[45] Date of Patent: Jul. 16, 1991

[54] FLUORESCENT COMPOSITION

[75] Inventors: Fumio Takahashi, Odawara; Kunihiko Yoneshima, Hiratsuka; Takashi Hase, Ebina, all of Japan

[73] Assignee: Kasei Optonix, Ltd., Tokyo, Japan

[21] Appl. No.: 259,526

[22] Filed: Oct. 18, 1988

[30] Foreign Application Priority Data

Oct. 19, 1987 [JP] Japan .................. 62-263224

[51] Int. Cl.$^5$ .................. C09K 11/54; F21V 9/00
[52] U.S. Cl. .................. 252/301.60 S; 252/301.6 R; 252/301.4 S; 252/582
[58] Field of Search .......... 252/582, 301.6 R, 301.6 S, 252/301.4 R, 301.4 S

[56] References Cited

U.S. PATENT DOCUMENTS 4,106,946 8/1978 Ritze .................. 252/582

FOREIGN PATENT DOCUMENTS 2747509 4/1979 Fed. Rep. of Germany ... 252/301.6 S
63-284290 11/1988 Japan ..................... 252/301.5 S Primary Examiner—John S. Maples
Assistant Examiner—Philip Tucker
Attorney, Agent, or Firm—Oblon, Spivak, McClelland, Maier & Neustadt

[57] ABSTRACT

A fluorescent composition composed of a mixture of a sulfide phosphor and a conductive material, the sulfide phosphor consisting essentially of a sulfide of the formula $(Zn_{1-x}, Cd_x)S$ wherein x is a number satisfying a condition of $0 \leq x \leq 1$, as host material, and zinc oxide (ZnO) or a compound capable of being converted to zinc oxide (ZnO) by heat treatment and alumina, adhered to the surface of the host material.

4 Claims, 2 Drawing Sheets

FLUORESCENT COMPOSITION

BACKGROUND OF THE INVENTION

1. Field of the Invention

The present invention relates to an improvement of a fluorescent composition. More particularly, it relates to a fluorescent composition capable of emitting light of high luminance under low-velocity electron excitation at an acceleration voltage of not higher than a few hundreds volts and having the decrease in luminance with time during the use for a long time reduced.

2. Description of Background

Zinc activated zinc oxide phosphors (ZnO:Zn) are well known as phosphors which can emit light of high luminance under excitation by low-velocity electron beams at an acceleration voltage of not higher than 1 kV, particularly not higher than a few hundreds volts. When excited by low-velocity electron beams, the ZnO:Zn phosphors emit green-white light of high luminance, and the fluorescent display devices having fluorescent screens composed of such ZnO:Zn phosphors are widely used as display elements for table-top calculators, various meters for vehicles and electrical appliances such as VTR.

In recent years, reflecting the expansion of the field of the application of the fluorescent display devices, a variety of emitting colors are desired for the fluorescent display devices. Various developments have been made on the fluorescent materials which are capable of emitting light other than green light under low-velocity electron excitation. As a result, some fluorescent materials have been developed. Among them, fluorescent compositions are known which are prepared by mixing a conductive material such as indium oxide ($In_2O_3$), zinc oxide (ZnO) or tin oxide ($SnO_2$) to a sulfide phosphor consisting essentially of a sulfide of the formula $(Zn_{1-x}, Cd_x)S$ wherein x is a number satisfying a condition of $0 \leq x \leq 1$, as host material, which is activated by zinc (Zn), silver (Ag), gold (Au), copper (Cu) or manganese (Mn) and, if necessary, co-activated by halogen, aluminum (Al), gallium (Ga) or indium (In) (Japanese Examined Patent Publications No. 33153/1984 and No. 33155/1984 and Japanese Examined Patent Publication Nos. 44035/1987 and 53554/1987). (A phosphor consisting essentially of a sulfide of the formula $(Zn_{1-x}, Cd_x)S$ wherein x is a number satisfying a condition of $0 \leq x \leq 1$, as host material, will generally be referred to hereinafter as "a $(Zn_{1-x}, Cd_x)S$ type sulfide phosphor".) When excited by low-velocity electron beams at an acceleration voltage of not higher than 1 kV, these fluorescent compositions exhibit emission of visible lights of high luminance ranging from blue to red depending upon the solid solution ratio (x value) of Cadmium (Cd) to Zinc (Zn) in the $(Zn_{1-x}, Cd_x)S$ type sulfide phosphor host material as one of the constituting components of the fluorescent compositions or upon the combination of activators and co-activators. Therefore, by using such fluorescent compositions as fluorescent screens, it has been made possible to obtain a variety of colors for fluorescent display devices, and the amount of information has been remarkably improved. However, fluorescent display devices using, as fluorescent screens, fluorescent compositions composed mainly of such $(Zn_{1-x}, Cd_x)S$ type sulfide phosphors, have a serious drawback that when operated for a long period of time, there will likely be a decrease in luminance of the fluorescent layer or non-uniformity in emission, which is considered to be attributable to a deterioration of the $(Zn_{1-x}, Cd_x)S$ type sulfide phosphor in the fluorescent screen, or deposition of a decomposed product of the phosphor to the filament. Therefore, it has been desired to develop a fluorescent composition which hardly undergoes a deterioration or decomposition even under excitation by low-velocity electron beams for a long period of time and which scarcely brings about a decrease in luminance or non-uniformity in emission.

SUMMARY OF THE INVENTION

The present invention has been made in view of such a desire. It is an object of the present invention to provide a fluorescent composition which exhibits emission of light of high luminance under excitation by low-velocity electron beams and which is less susceptible to deterioration or decomposition when used as a fluorescent screen for emission of light for a long period of time and which scarcely brings about a decrease in luminance with time or non-uniformity of emission of the fluorescent layer.

The present inventors have conducted various studies on the surface treatment of the $(Zn_{1-x}, Cd_x)S$ type sulfide phosphors, particularly the surface treating agents, in order to accomplish the above object. As a result, it has been found possible to accomplish the above object by using a $(Zn_{1-x}, Cd_x)S$ type sulfide phosphor treated for adhering zinc oxide (ZnO) or a compound capable of being converted to zinc oxide (ZnO) by heat treatment (hereinafter referred to generally as a Zn compound) and alumina simultaneously on the surface of the $(Zn_{1-x}, Cd_x)S$ type phosphor, as a constituting component of the fluorescent composition. The present invention has been accomplished on the basis of this discovery.

The present invention provides a fluorescent composition composed of a mixture of a sulfide phosphor and a conductive material, the sulfide phosphor consisting essentially of a sulfide of the formula $(Zn_{1-x}, Cd_x)S$ wherein x is a number satisfying a condition of $0 \leq x \leq 1$, as host material, and zinc oxide (ZnO) or a compound capable of being converted to zinc oxide (ZnO) by heat treatment and alumina, adhered to the surface of the host material.

DETAILED DESCRIPTION OF THE PREFERRED EMBODIMENTS

Figure 1:
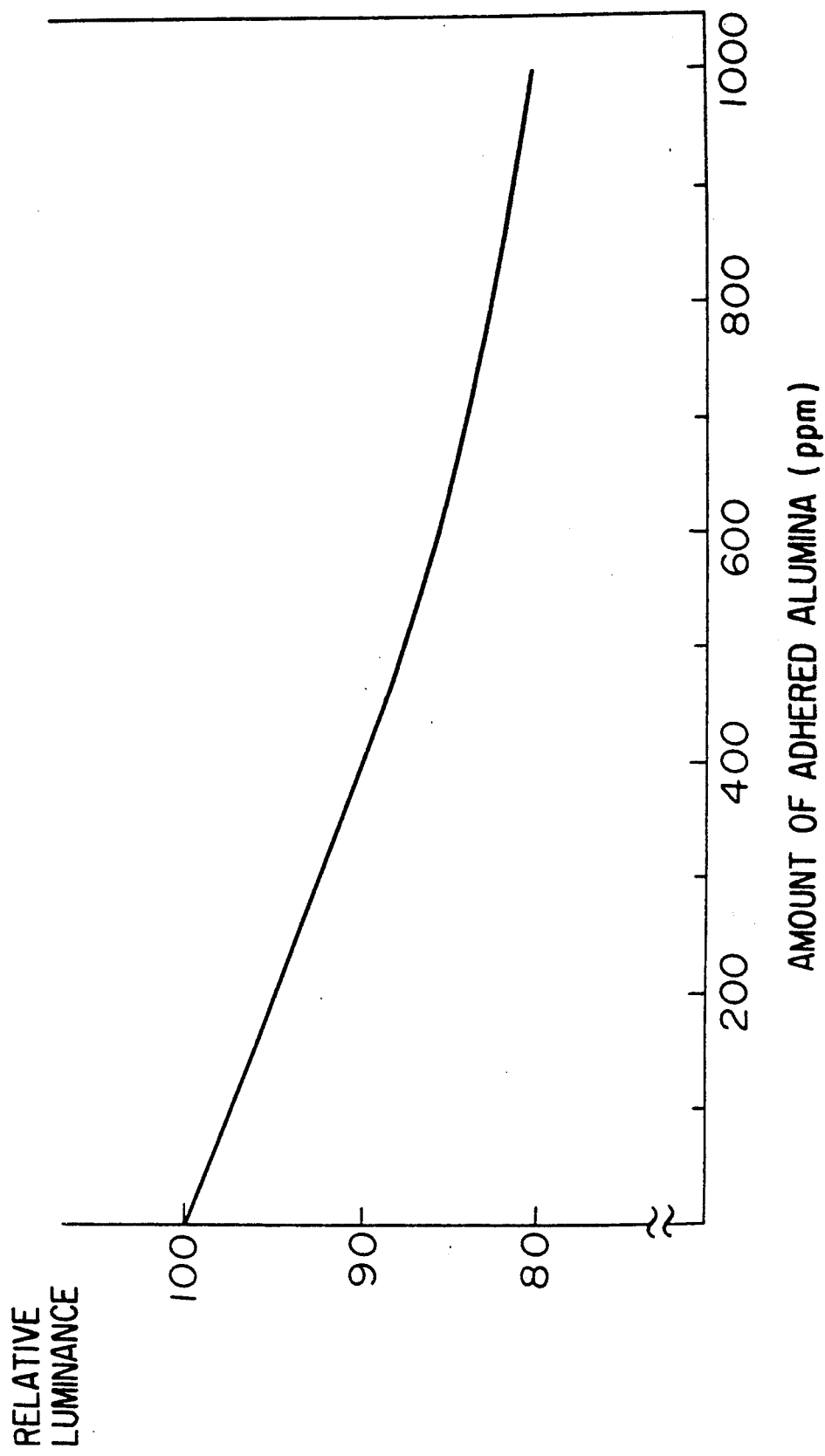
FIG. 1 is a graph showing the relation between the amount of alumina adhered to the sulfide phosphor contained in the fluorescent composition and the initial luminance of the fluorescent display device using this fluorescent composition.

Now, a method for the preparation of the fluorescent composition of the present invention will be described.

The method for the preparation of the fluorescent composition of the present invention is the same for the preparation of the conventional fluorescent composition composed of a mixture of a phosphor and a conductive material except that a $(Zn_{1-x}, Cd_x)S$ sulfide phosphor having a Zn compound and alumina adhered to its surface is used as one of the constituting components of the fluorescent composition. Namely, it is produced by mixing or adhering a conductive material by a known method to the $(Zn_{1-x}, Cd_x)S$ type sulfide phosphor having alumina and the Zn compound adhered thereto.

Namely, firstly, the $(Zn_{1-x}, Cd_x)S$ type sulfide phosphor having a Zn compound and alumina adhered is prepared by the following method.

Firstly, a $(Zn_{1-x}, Cd_x)S$ type sulfide phosphor having an optional composition is put into pure water and throughly stirred and suspended. As the $(Zn_{1-x}, Cd_x)S$ type sulfide phosphor to be used for the fluorescent composition of the present invention, any known sulfide consisting essentially of a sulfide host material of the formula $(Zn_{1-x}, Cd_x)S$, such as ZnS:Zn, ZnS:Ag,Cl, ZnS:Ag,Cl,Li, ZnS:Ag,Al, ZnS:Mn,Cl, (Zn,Cd)S:Cu,Al, (Zn,Cd)S:Au,Al, (Zn,Cd)S:Au,Cu,Al, or CdS:Ag, activated by an activator such as zinc (Zn), silver (Ag), copper (Cu), gold (Au) or manganese (Mn) and if necessary, co-activated by a first co-activator such as aluminum (Al) or a halogen element (Cl, Br, I or F) as well as a second co-activator such as an alkali metal element (Li, Na, K, Rb, or Cs), Gallium (Ga) or indium (In). Among these sulfide phosphors, particularly when a sulfide phosphor of the above formula wherein x is from 0.3 to 0.7 wherein a solid solution of ZnS and CdS is the host material, is employed, the degree of the decrease in luminance with time of the resulting fluorescent composition can be made small.

Then, predetermined amounts of alumina and a Zn compound are introduced to the aqueous suspension of the $(Zn_{1-x}, Cd_x)S$ type sulfide phosphor, and the mixture is throughly stirred and then subjected to filtration or evaporation to dryness, followed by drying at a temperature of at least 130° C. to obtain a $(Zn_{1-x}, Cd_x)S$ sulfide phosphor having the Zn compound and alumina adhered on the surface, as one of the constituting components of the fluorescent composition of the present invention.

The alumina to be adhered to the $(Zn_{1-x}, Cd_x)S$ type sulfide phosphor includes various types of alumina such as $\alpha$-alumina, $\beta$-alumina and $\gamma$-alumina, as well as a dehydrated product obtained by partially or wholly dehydrating an alumina hydrate (alumina sol) or aluminum hydroxide by heating. (These materials will generally be referred to as "alumina"). The alumina to be used for this purpose preferably has a particle size as small as possible. Particularly preferred is an alumina sol having super fine alumina particles with an average particle size of not more than 1 $\mu$m dispersed in water.

As the Zn compound to be adhered to the $(Zn_{1-x}, Cd_x)S$ sulfide phosphor, zinc oxide (ZnO) or a Zn compound, of which at least a part can be thermally decomposed and converted to ZnO by heat treatment at a temperature of from 100° to 700° C., such as the hydroxide, sulfate, nitrate, carbonate, halide or hydroxy salt of zinc (Zn), can be used. However, in order to adhere the Zn compound together with alumina to the $(Zn_{1-x}, Cd_x)S$ sulfide phosphor, instead of the above described manner in which the Zn compound is simply added to a solution in which a sulfide phosphor and alumina are suspended, followed by filtration or evaporation to dryness to adhere the initially added Zn compound itself together with alumina to the sulfide phosphor, it is preferred that a soluble Zn compound is added to water, then by an addition of an alkali such as NH$_4$OH or NaOH, ammonium carbonate or oxalic acid to this solution, the initially added Zn compound is precipitated as the hydroxide, carbonate or oxalate, which is adhered together with the co-existent alumina to the surface of the sulfide phosphor, whereby the decrease in luminance with time of the resulting fluorescent composition can effectively be suppressed. Accordingly, as the Zn compound to be employed, a water-soluble Zn compound such as the sulfate, nitrate or halide is preferred.

On the other hand, from the viewpoint of the initial luminance of the resulting fluorescence composition, it is desirable that finally at least ZnO is adhered to the surface of the $(Zn_{1-x}, Cd_x)S$ sulfide phosphor. For this purpose, among the above-mentioned Zn compounds, it is more preferred to employ the hydroxide of Zn as the Zn compound since it has a low thermal decomposition temperature and it can readily be converted to ZnO by heat treatment. The hydroxide of Zn may be adhered together with alumina to the $(Zn_{1-x}, Cd_x)S$ type sulfide phosphor. Otherwise, an alkali may be added to a solution wherein the $(Zn_{1-x}, Cd_x)S$ type sulfide phosphor, alumina and zinc ions are present to finally precipitate the hydroxide of Zn, which is adhered together with alumina to the $(Zn_{1-x}, Cd_x)S$ type sulfide phosphor.

Then, the $(Zn_{1-x}, Cd_x)S$ type sulfide phosphor having the Zn compound and alumina adhered to its surface, prepared as described above, is thoroughly mixed with a conductive material as the other constituting component of the fluorescent composition of the present invention, by means of mortar, a ball mill or a mixer mill, or the conductive material may be adhered to the surface of the sulfide phosphor by a conventional method such as a method of using an adhesive such as gelatine and gum arabic (Japanese Examined Patent Publication No. 3677/1979), an electrostatic coating method (Japanese Examined Patent Publication No. 44275/1979) or a method of using an organic binder such as ethyl cellulose or nitro cellulose (Japanese Examined Patent Publication No. 33266/1987), to obtain the fluorescent composition of the present invention.

As the conductive material to be used for the fluorescent composition of the present invention, any material which is useful for the conventional fluorescent compositions for low velocity electron excitation such as indium oxide ($In_2O_3$), zinc oxide (ZnO), tin oxide ($SnO_2$), titanium oxide ($TiO_2$), tungsten oxide ($WO_3$), niobium oxide ($Nb_2O_5$), cadmium sulfide (CdS) or copper sulfide ($Cu_2S$) may be employed. The weight ratio of the $(Zn_{1-x}, Cd_x)S$ type sulfide phosphor to the conductive material may vary depending upon the particle size of the conductive material used. However, as in the case of a conventional fluorescent composition for low-velocity electron excitation composed of a mixture of a phosphor and a conductive material, when they are mixed in a weight ratio of from 99:1 to 1:1, a practically useful fluorescent composition with high luminance will be obtained.

Figure 2:
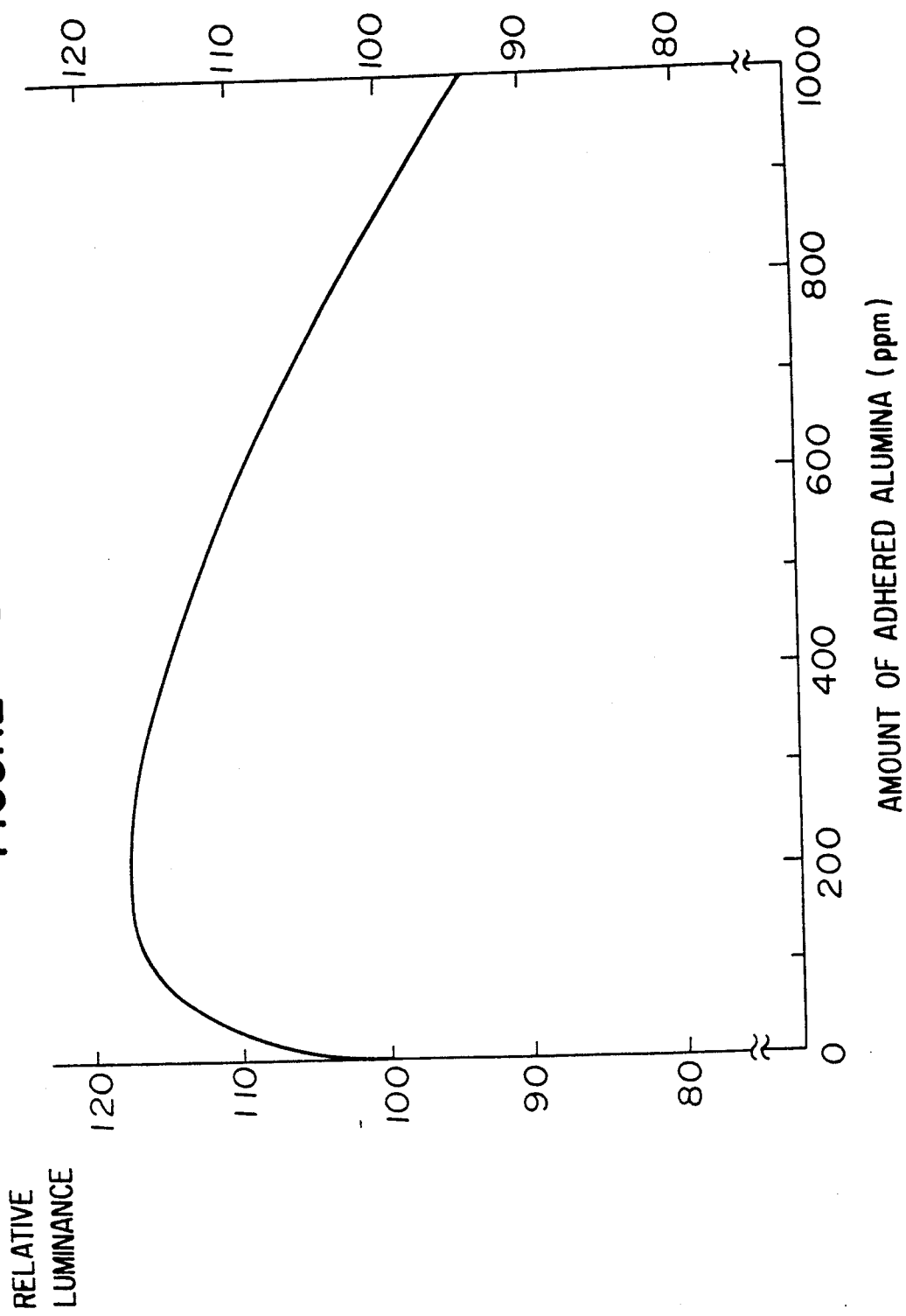
FIG. 2 is a graph showing the relation between the amount of alumina adhered to the sulfide phosphor contained in the fluorescent composition of the present invention and the luminance after the operation for 1,000 hours of the fluorescent display device using this fluorescent composition.

FIGS. 1 and 2 are graphs which respectively show the relation between the amount of alumina (as calculated by weight of aluminum) adhered to a $(Zn_{0.55}, Cd_{0.45})S$:Ag,Cl,Li phosphor in a fluorescent composition used for a fluorescent screen of a fluorescent display device and the relative initial luminance of the fluorescent display device (FIG. 1) and the relation between the amount of adhered alumina and the relative luminance after the operation of the fluorescent display device for 1,000 hours (FIG. 2), when the fluorescent display device was operated at an anode plate voltage of 30 V, wherein as the fluorescent screen, the fluorescent composition of the present invention was used which was prepared by mixing 10% by weight of $In_2O_3$ as conductive material to the $(Zn_{0.55}, Cd_{0.45})S:Ag,Cl,Li$ phosphor having alumina and ZnO adhered to its surface by using the $(Zn_{0.55}, Cd_{0.45})S:Ag,Cl,Li$ phosphor, alumina sol and 0.1% by weight as calculated as zinc (Zn) of ZnO (as the Zn compound, zinc sulfate was used, and it was once converted to hydroxide by alkali, then coated and converted by heat treatment to ZnO).

It is evident from FIGS. 1 and 2 that when alumina is adhered together with ZnO to the $(Zn_{0.55}, Cd_{0.45})S:Ag,Cl,Li$ phosphor, the initial luminance of the fluorescent composition using such a phosphor gradually decreases with an increase of the amount of adhered alumina. However, the luminance after the operation for 1,000 hours is higher than the case where the $(Zn_{0.55}, Cd_{0.45})S:Ag,Cl,Li$ phophor having no alumina adhered is used, when the amount of adhered alumina is not higher than about 850 ppm (preferably about 20–700 ppm), whereby the decrease in luminance with time is lower when operated for a long period of time.

With the fluorescent composition of the present invention, if the amount of ZnO adhered together with alumina to the $(Zn_{0.55}, Cd_{0.45})S:Ag,Cl,Li$ phosphor is less than 0.005% by weight or more than 1% by weight, the initial luminance of the resulting fluorescent composition is low, and even if the amount of alumina adhered to the $(Zn_{0.55}, Cd_{0.45})S:Ag,Cl,Li$ phosphor is increased, the luminance after the operation for 1,000 hours is not so high, whereby no distinct effect of adhering alumina is observed.

In FIGS. 1 and 2, the relation between the amount of alumina adhered to a $(Zn_{0.55}, Cd_{0.45})S:Ag,Cl,Li$ phosphor and the initial luminance of a fluorescent display device and the relation between the amount of adhered alumina and the luminance after the operation for 1,000 hours are shown with respect to a fluorescent display device wherein a fluorescent composition composed of a mixture of $In_2O_3$ (10% by weight of conductive material) and the $(Zn_{0.55}, Cd_{0.45})S:Ag,Cl,Li$ phosphor having ZnO (0.1% by weight of Zn) formed from zinc sulfate and alumina adhered to its surface. Substantially the same relations as FIGS. 1 and 2 were observed also in the cases where phosphors other than $(Zn_{0.55}, Cd_{0.45})S:Ag,Cl,Li$ were used as the $(Zn_{1-x}, Cd_x)S$ sulfide phosphor, where a compound other than zinc sulfate was used as the Zn compound, and where a conductive material other than $In_2O_3$ was used. Namely, it has been confirmed that when the amounts of alumina and the ZnO compound adhered to the $(Zn_{1-x}, Cd_x)S$ type sulfide phosphor as a component of the fluorescent composition are respectively not larger than about 850 ppm (preferably about 20–700 ppm) and within a range of from about 0.005 to about 1% by weight, the fluorescent display device using the resulting fluorescent composition as the fluorescent screen has a low degree of the decrease in luminance with time after the operation for a long period of time.

Now, the present invention will be described in detail with reference to Examples. However, it should be understood that the present invention is by no means restricted by such specific Examples.

EXAMPLE 1

100 g of a $(Zn_{0.55}, Cd_{0.45})S:Ag,Cl,Li$ phosphor was put into 400 ml of pure water and stirred for about 10 minutes. Then, 0.68 ml of an alumina sol solution having a solid content of at least 10% was dropwise added thereto, and the stirring was continued to obtain a suspension. Separately, 230 mg of zinc sulfate ($ZnSO_4.7H_2O$) was dissolved in 50 ml of pure water and throughly stirred, and then the above suspension was added thereto. After stirring for 10 minutes, NaOH was gradually added to this suspension, and the pH was adjusted to about 9, whereby zinc hydroxide together with alumina was precipitated on the surface of the phosphor. Water was removed from this suspension, and the residue was put in a heat resistant container and baked in an electric furnace at a temperature of 180° C. for 24 hours, and then withdrawn to obtain a $(Zn_{0.55}, Cd_{0.45})S:Ag,Cl,Li$ phosphor having 200 ppm as calculated as Al of alumina and about 0.1% by weight as calculated as Zn of ZnO adhered to the surface.

Then, 90 parts by weight of the $(Zn_{0.55}, Cd_{0.45})S:Ag,Cl,Li$ phosphor thus obtained and 10 parts by weight of $In_2O_3$ (conductive material) having an average particle size of 0.24 μm were throughly mixed by a ball mill to obtain a fluorescent composition (I).

Separately, for the purpose of comparison, a fluorescent composition (R-I) (conventional fluorescent composition) was prepared in the same manner as the fluorescent composition (I) except that a $(Zn_{0.55}, Cd_{0.45})S:Ag,Cl,Li$ phosphor having no alumina or ZnO adhered to the surface was used instead of the $(Zn_{0.55}, Cd_{0.45})S:Ag,Cl,Li$ phosphor having alumina and ZnO adhered to the surface.

Then, a fluorescent display device (I) and a fluorescent display device (R-I) (conventional fluorescent display device) were prepared by using the fluorescent composition (I) and the fluorescent composition (R-I), respectively, and operated for 1,000 hours under the operational condition of an anode plate voltage of 30 V, whereupon the luminance of the respective fluorescent display devices was measured. The luminance of the fluorescent display device (I) was about 118% of the luminance of the fluorescent display device (R-I). Thus, the decrease in luminance after the operation of 1,000 hours was remarkably reduced, and non-uniformity of emission was minimum.

EXAMPLE 2

In the same manner as in Example 1 except that as the starting materials for fluorescent compositions, phosphors as identified in the column for "Starting materials" in Table 1 were used instead of the $(Zn_{0.55}, Cd_{0.45})S:Ag,Cl,Li$ phosphor, the alumina sol solution in the amount as identified in the column for "Starting materials" in Table 1 was used instead of 0.68 ml of the alumina sol solution having a solid content of at least 10%, and 450 mg of $ZnSO_4.7H_2O$ dissolved in 100 ml of pure water was used instead of 230 ml of zinc sulfate ($ZnSO_4.7H_2O$) dissolved in 50 ml of pure water, alumina and ZnO were adhered in the respective amounts as identified in the column for "Composition" in Table 1 to the respective phosphors.

The respective phosphors having alumina and ZnO adhered as described above were mixed with $In_2O_3$ in the mixing ratios as identified in the column for "Composition" in Table 1, and fluorescent compositions (II), (III) and (IV) were prepared in the same manner as the fluorescent composition (I) in Example 1.

Separately, for the purpose of comparison, fluorescent compositions (R-II), (R-III) and (R-IV) (conventional fluorescent compositions) were prepared in the same manner as the fluorescent compositions (II), (III)

and (IV) except that the above-mentioned respective phosphors having no alumina or ZnO adhered to the surface were used instead of the above-mentioned respective phosphors having alumina and ZnO adhered to the surface.

Then, fluorescent display devices (II), (III) and (IV) and fluorescent display devices (R-II), (R-III) and (R-IV) (conventional fluorescent display devices) were prepared by using the fluorescent compositions (II), (III) and (IV) and the fluorescent compositions (R-II), (R-III) and (R-IV), respectively, and operated for 1,000 hours under an operating condition of an anode plate voltage of 30 V, whereupon the luminance of the respective fluorescent display devices was measured. The results were as shown in Table 2. The fluorescent display devices (II), (III) and (IV) all showed high luminance, the decrease in luminance with time after the operation for 1,000 hours was remarkably reduced and non-uniformity of emission was minimum, as compared with the fluorescent display devices (R-II), (R-III) and (R-IV) using, as fluorescent screens, fluorescent compositions composed of phosphors having the same compositions except that alumina and ZnO were not adhered, when the corresponding fluorescent display devices wherein the compositions of the sulfide phosphors per se were the same, were compared.

TABLE 1

| Fluorescent composition No. | Starting materials | | |
|---|---|---|---|
| | Phosphor composition | Amount of aluminasol added | Amount of $ZnSO_4 \cdot 7H_2O$ added |
| (II) | $(Zn_{0.22}, Cd_{0.78})S$: Ag,Cl,Na | 0.15 ml | 450 mg |
| (III) | $(Zn_{0.9}, Cd_{0.1})S$: Au,Al,Na | 0.28 ml | 450 mg |
| (VI) | ZnS:Cu,Al,Na | 0.20 ml | 450 mg |

| Fluorescent composition No. | Composition | | |
|---|---|---|---|
| | Amount of adhered alumina | Amount of adhered ZnO | Weight ratio of phospor/$In_2O_3$ |
| (II) | 120 ppm | 0.2 wt % | 95/5 |
| (III) | 200 ppm | 0.2 wt % | 85/15 |
| (VI) | 150 ppm | 0.2 wt % | 80/20 |

TABLE 2

| Fluorescent display device No. | Fluorescent composition used | Relative luminance after the operation for 1,000 hours |
|---|---|---|
| (II) | Fluorescent composition (II) | 117 |
| (R-II) | Fluorescent composition (R-II) | 100 |
| (III) | Fluorescent composition (III) | 110 |
| (R-III) | Fluorescent composition (R-III) | 100 |
| (VI) | Fluorescent composition (VI) | 113 |
| (R-VI) | fluorescent composition (R-VI) | 100 |

The fluorescent composition of the present invention is capable of emitting light of high luminance under excitation by low-velocity electron beams at an acceleration voltage of not higher than a few kV, particularly not higher than 100 V, and as compared with conventional fluorescent compositions composed of $(Zn_{1-x}, Cd_x)S$ type sulfide phosphors, the decrease in luminance with time due to the decomposition or deterioration under excitation by low-velocity electron beams for a long period of time, is less. When such a composition is used as a fluorescent screen for a fluorescent display device, it presents a feature that non-uniformity of emission scarcely forms, and thus it is useful as a fluorescent screen for a fluorescent display device.

What is claimed is:

1. A fluorescent composition composed of a mixture of a sulfide phosphor and a conductive material, said sulfide phosphor consisting of a sulfide of the formula $(Zn_{1-x}, Cd_x)S$ wherein x is a number satisfying a condition of $0 \leq x \leq 1$, as host material, and a material consisting of zinc oxide (ZnO) or a compound capable of being converted to zinc oxide (ZnO) by heat treatment and alumina, adhered to the surface of said sulfide phosphor.

2. The fluorescent composition according to claim 1, wherein the amount of the adhered alumina is more than 0 and not more than 850 ppm as calculated as aluminum.

3. The fluorescent composition according to claim 1, wherein the amount of the adhered zinc oxide or compound capable of being converted to zinc oxide by heat treatment is within a range of from 0.005 to 1.0% by weight as calculated as zinc based on said sulfide phosphor.

4. The fluorescent composition according to claim 2, wherein the amount of the adhered zinc oxide or compound capable of being converted to zinc oxide by heat treatment is within a range of from 0.005 to 1.0% by weight as calculated as zinc.

* * * * *